United States Patent [19]

Lam

[11] 4,317,205
[45] Feb. 23, 1982

[54] WIDEBAND TRANSCEIVER WITH EMI SUPPRESSION

[75] Inventor: Tat C. Lam, Fremont, Calif.
[73] Assignee: TCL, Inc., Santa Clara, Calif.
[21] Appl. No.: 159,364
[22] Filed: Jun. 13, 1980
[51] Int. Cl.³ .............................................. H04B 1/38
[52] U.S. Cl. ...................................... 375/7; 179/2 C; 333/17 M
[58] Field of Search ............... 375/7, 36, 58; 179/2 C; 178/63 R, 63 A, 63 B, 63 C; 333/17 M, 24 R, 32

[56] References Cited

U.S. PATENT DOCUMENTS 4,038,601  7/1977  Laborie et al. ...................... 375/36
4,086,534  4/1978  Olson .................................... 375/7

Primary Examiner—Glen R. Swann, III
Attorney, Agent, or Firm—Limbach, Limbach & Sutton

[57] ABSTRACT

A data communications transceiver for transmitting signals to and from the communicating medium, with the transceiver including an input terminal, a short time constant differentiator connected to the input terminal to differentiate signals applied thereto, a Schmitt trigger supplied with the output of the short time constant differentiator for producing a corresponding square wave output signal, a first driver supplied with the square wave output of the Schmitt trigger for supplying it to the communicating means, amplifying means for receiving signals from the communicating medium and for producing an amplified output therefrom, a second short time constant differentiator supplied with the output of the amplifying means and for supplying it to a second Schmitt trigger for producing a corresponding second square wave signal, and a second driver supplied with a second square wave signal for supplying it to an output terminal. In the preferred embodiment of the invention, electromagnetic interference is suppressed by connecting a bifilar transformer between the output of the first driver in the communicating medium, with the primary of the transformer being in series between the driver and the center conductor of the shielded communicating medium and with the secondary of the transformer being connected in series between the shield or the communicating medium and the floating ground of the transceiver circuit. A bypass capacitor is connected between the shield of the communicating medium and the circuit ground. Furthermore, an enable circuit is connected between the amplifying means and the second Schmitt trigger to only enable the Schmitt trigger when the amplitude of the received signal exceeds a predetermined minimum which is higher than threshold level of the Schmitt trigger.

7 Claims, 16 Drawing Figures

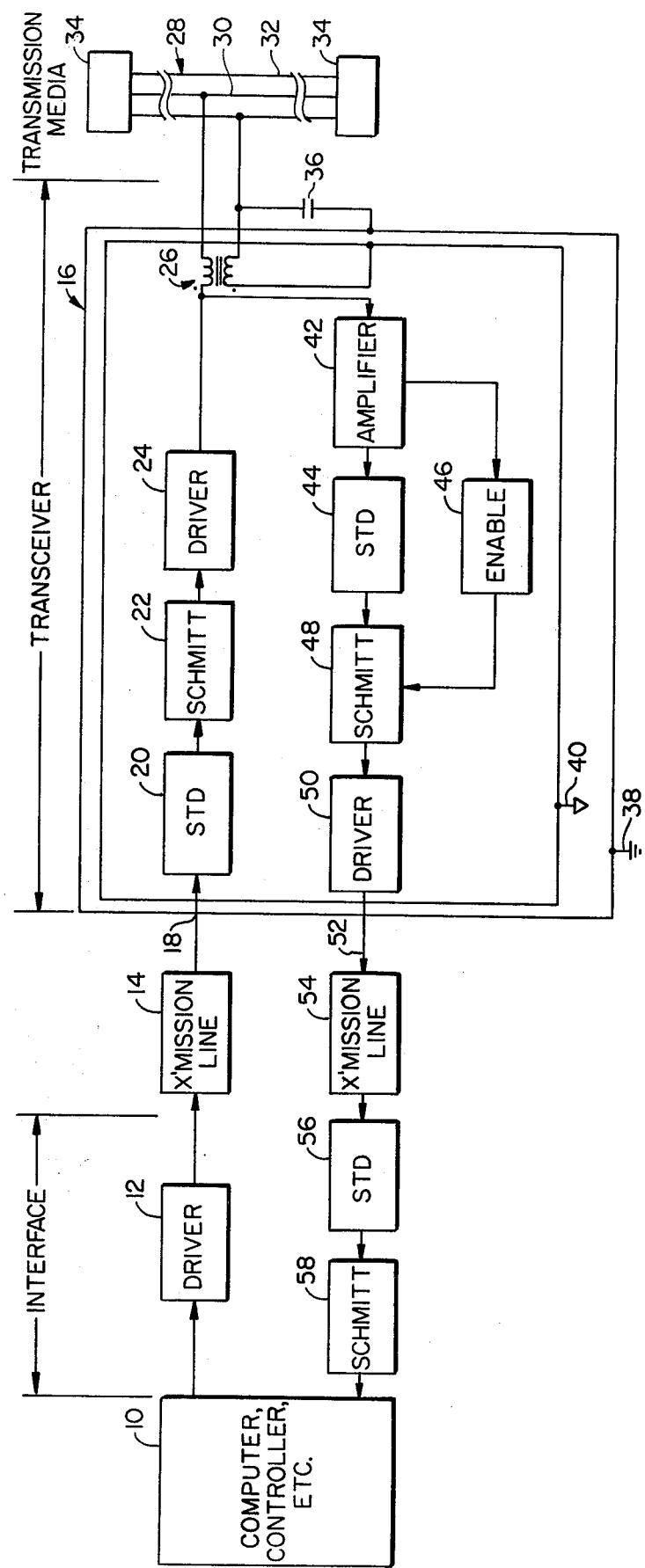
FIG._1.

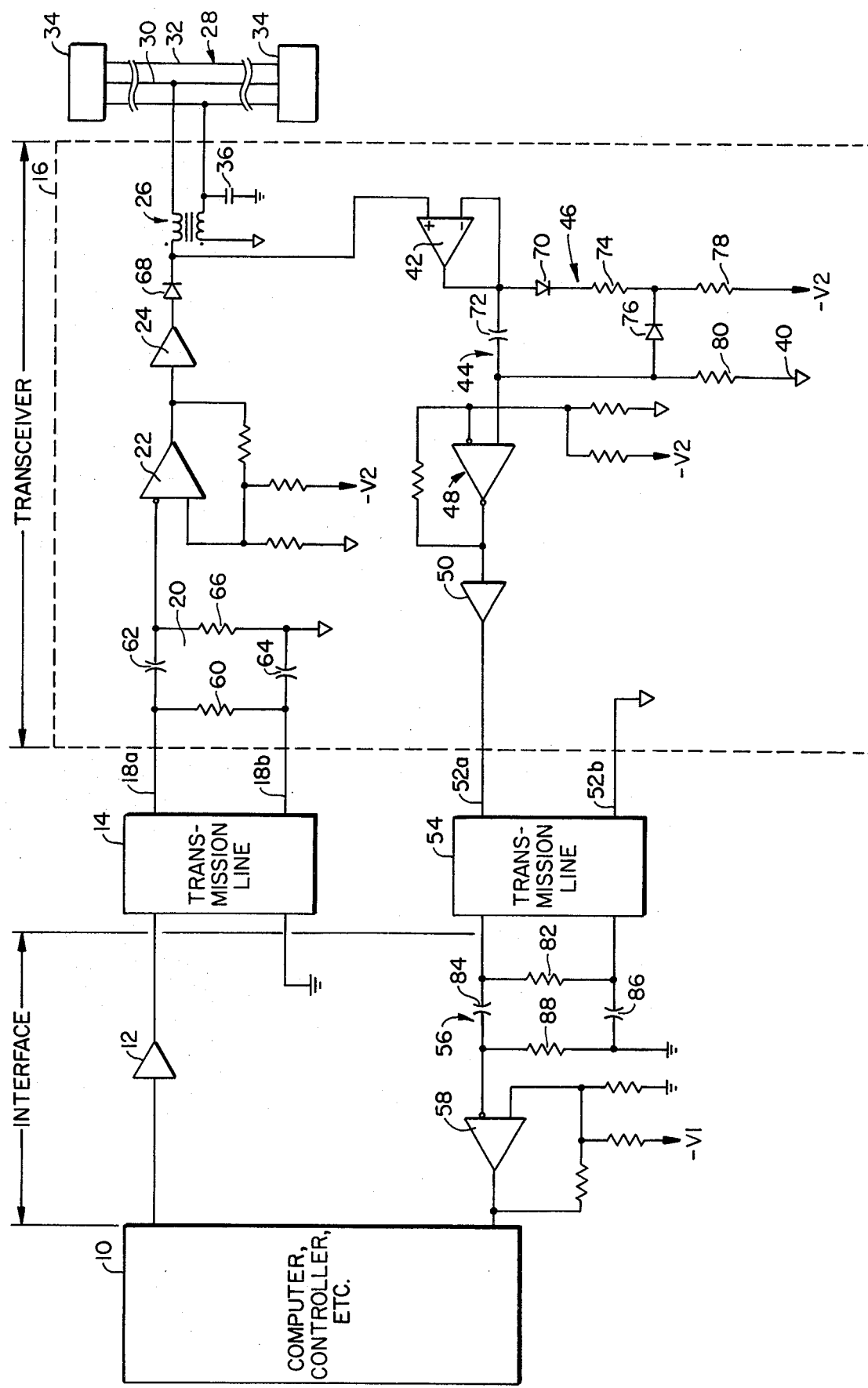
FIG._2.

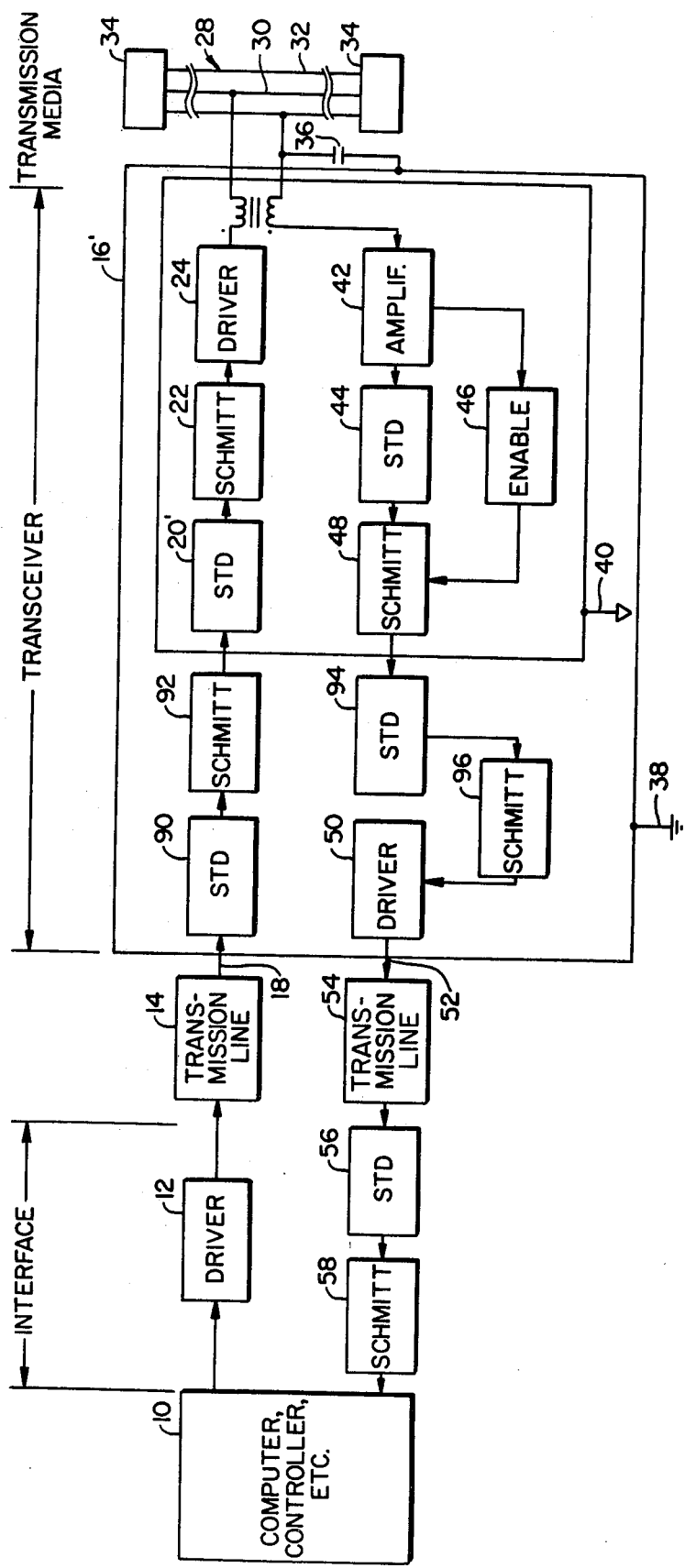
FIG._3.

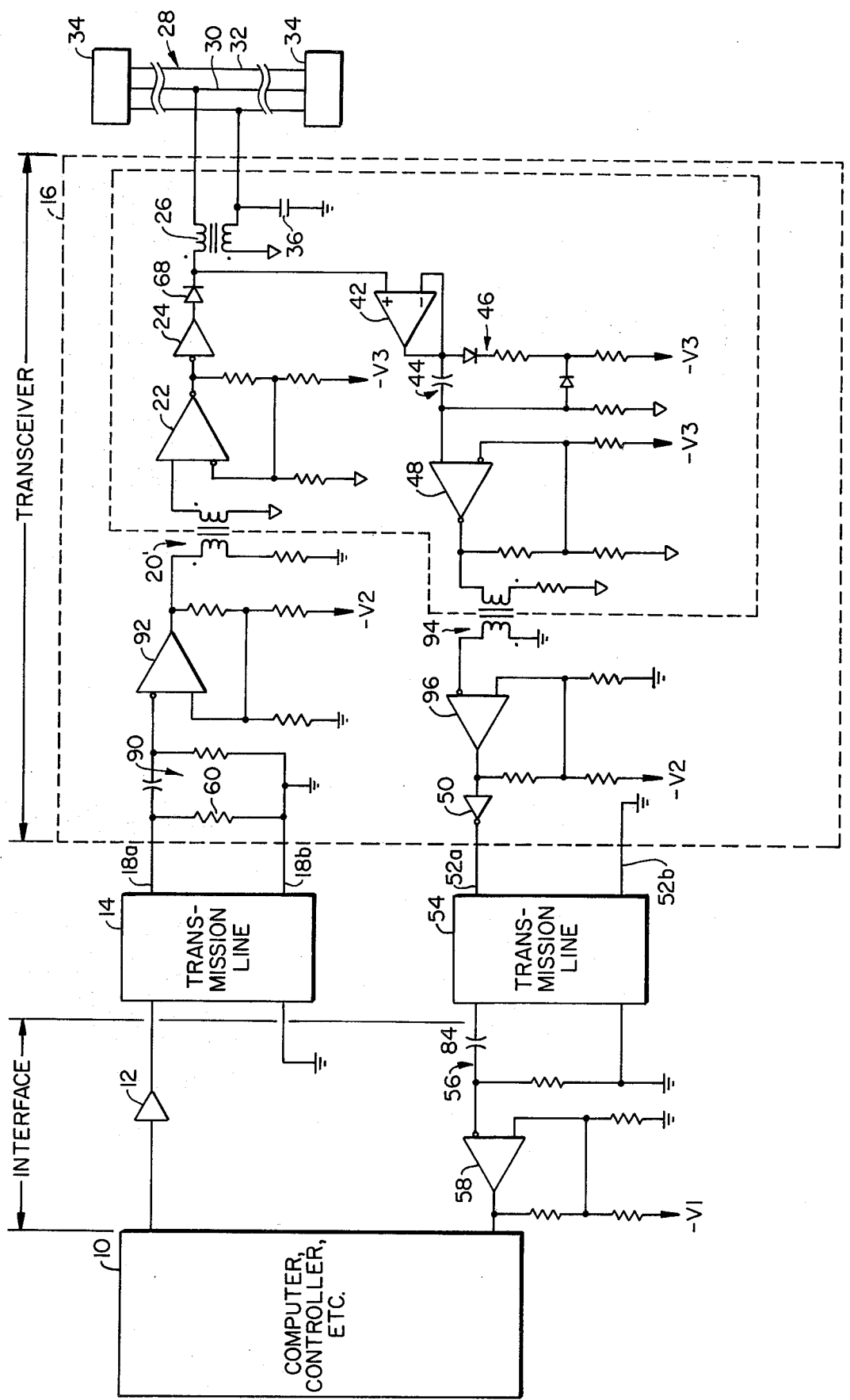
FIG._4.

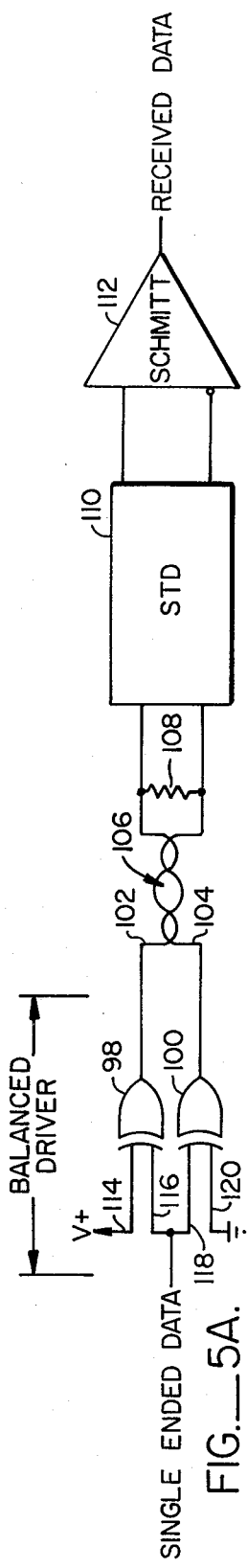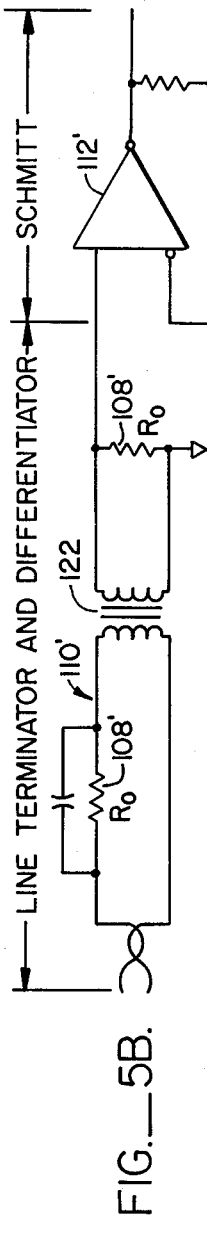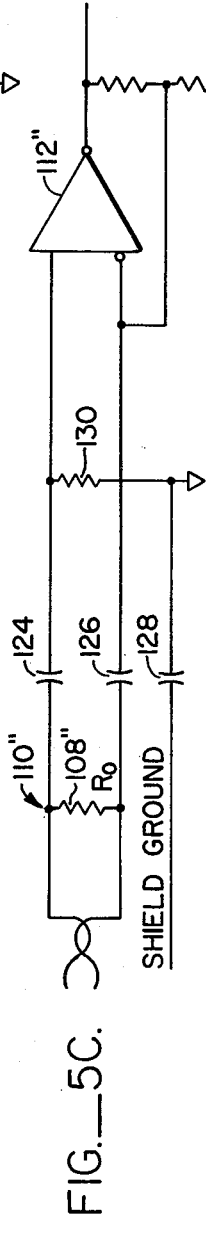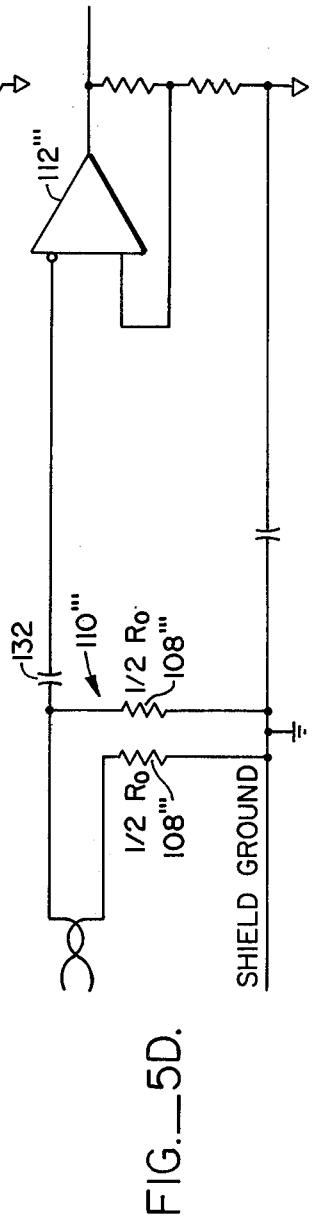
FIG._5A. FIG._5B. FIG._5C. FIG._5D.

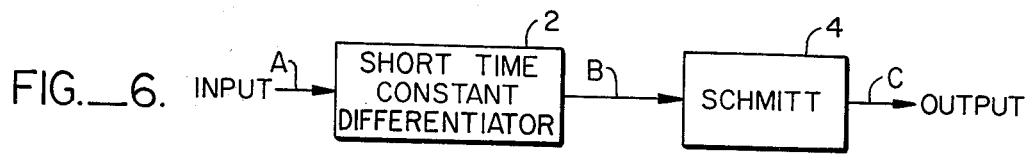
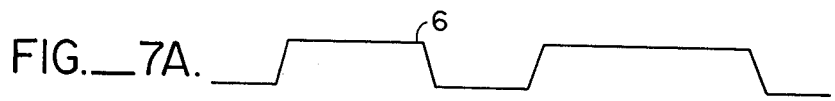
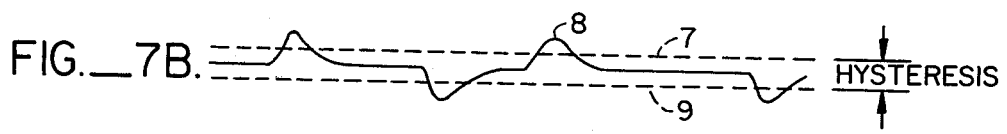
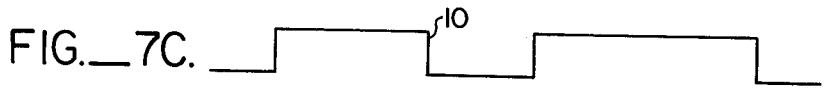
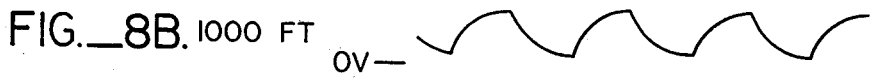
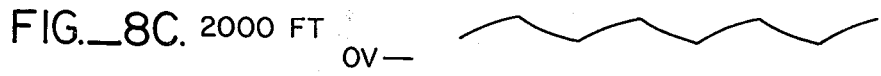
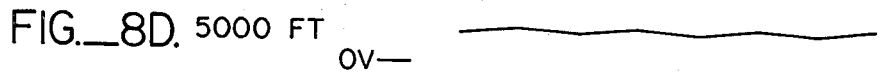

WIDEBAND TRANSCEIVER WITH EMI SUPPRESSION

BACKGROUND OF THE INVENTION

1. Field of the Invention

The present invention relates to data communication transceivers using base band packet switching, sometimes known as the Ethernet system.

2. Description of the Prior Art

In prior art data communications transceivers, the receiver part of the transceiver is either direct coupled or capacity coupled to the communicating medium, such as a shielded coaxial cable. In the former case, the voltage level of the signal will affect the skew of the received data. In the latter case, noise or reflection on the transmission line can be coupled to the receiver which in turn will be received as an unwanted signal. Furthermore, the capacitive, that is, AC coupling, will limit the low frequency data to the extent of the differentiation being used by the coupling.

Another problem is that when the transceiver is transmitting, electromagnetic interference may be present around the connection between the connector to the shielded cable and the shielded container of the transceiver. This electromagnetic interference is believed to be due to stray capacitance between the center conductor of the connector and the shielded container. A conventional way to minimize this effect is to shield the exposed center conductor or to make the outer connector much more capacitive relative to the shielded container than that of the center conductor. This can produce switching spikes which cause unwanted interference in the atmosphere around the transceiver because of high speed switching and this AC coupling to ground.

Still another problem occurs where the transmission medium, that is, the coaxial cable, is very long. In such cases there is a tendency for the waveform of the transmitted pulses to be flattened and extended on top of a DC level which increases in amplitude with the length of the transmission line. In order to receive and reconstruct these pulses, a Schmitt trigger is sometimes used, however, such a Schmitt trigger operates on the basis of the signal exceeding certain threshold voltage levels. Because of this rising DC amplitude, the phasing of the received signals will be somewhat erroneous compared to the original signal. Another problem is that if the Schmitt trigger threshold levels are set low enough to reconstruct these flattened pulse waveforms, noise and residual transmission signals can also be received by the transceiver, resulting in erroneous information. Also, heretofore Schmitt triggers in such circuits required D.C. coupling.

SUMMARY OF THE INVENTION

The above and other problems of prior art data communications transceivers are overcome by the present invention of a transceiver for transmitting signals to a communicating medium and for receiving signals therefrom which are generated by another transceiver. The transmitter portion of the invention comprises an input terminal, first short time constant differentiating means connecting to the input terminal to differentiate signals applied thereto and to produce a first differentiated output signal, Schmitt trigger means supplied with the differentiated output signal for producing a corresponding first square wave output signal and first driver means supplied with the square wave output signal for supplying it to the communicating medium. The receiver portion of the circuit of the invention includes amplifying means for receiving signals from the communicating medium and for producing an amplified output therefrom, second short time constant differentiation means supplied with the amplified output signal for producing a second differentiated signal, second Schmitt trigger means supplied with the second differentiated signal or producing a corresponding second square wave signal, an output terminal, and second driver means supplied with the second square wave signal for supplying it to the output terminal.

In the preferred embodiment of the invention, means are provided for enabling the second Schmitt trigger, i.e. the Schmitt trigger of the receiving portion of the transceiver, only when the amplitude of the received signal exceeds a predetermined value which is higher than the threshold level of the second Schmitt trigger. In this way, residual transmission and noise signals are rejected by the Schmitt trigger.

Also incorporated in the preferred embodiment of the transceiver are means for suppressing electromagnetic interference existing between the shielded container surrounding the transceiver and the center connector of the cable connecting it to the communicating medium. This electromagnetic interference is suppressed by means of a bifilar transformer which is inserted between the transmission medium, that is the coaxial cable, and the first driver and the amplifying means. The primary of the transformer is connected between the center conductor of the coaxial cable and the driver and amplifying means. The secondary winding of the transformer is connected at one lead to the shield of the coaxial cable and by its other lead to the floating ground of the transceiver. A bypass capacitor is connected between the shield of the coaxial cable and the circuit ground. One advantage of the transformer is that it suppresses unwanted spike signals which are generated by the bypass capacitor.

In still another modified embodiment of the invention, an extra short time constant differentiator and Schmitt trigger are inserted between the transceiver and the transmission line connection to the computer, controller or other circuit which is transmitting signals to the transceiver for retransmission onto the coaxial cable. Also an extra short time constant differentiator and an extra Schmitt trigger circuit are inserted between the second Schmitt trigger and the output driver of the receiver portion of the transceiver. These extra components are inserted to allow tying the computer, etc., ground to the transceiver ground.

In still another modified embodiment of the invention, a pair of exclusive OR gates are substituted for one or more of the driver circuits in the transceiver. These OR gates are connected with their outputs driving a balanced pair transmission line and with their noncorresponding inputs being connected to the single ended input to the driver. One of the remaining inputs of one of the gates is connected to the circuit ground and the other remaining input of the other gate is connected to a suitable bias voltage source.

It is therefore an object of the present invention to provide a data communications transceiver which can be used to obtain very long period information, even direct current, without a direct current coupling.

It is another object of the invention to provide a data communication transceiver suitable for use with a long line coaxial cable which suppresses noise and residual transmission signals.

It is still another object of the present invention to provide a data communication transceiver in which electromagnetic interference at the coupling to the coaxial cable is suppressed.

It is still a further object of the invention to provide a data communications transceiver incorporating a balanced line driver which has negligible skew and yet nearly meets commercial type RS 422 driver standards.

The foregoing and other objects, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a block diagram of the transceiver and associated circuitry according to the invention;

FIG. 2 is a more detailed circuit diagram of the transceiver depicted in block diagram form in FIG. 1;

FIG. 3 is a block diagram of a modified transceiver according to the invention;

FIG. 4 is a detailed schematic diagram of the transceiver depicted in block diagram form in FIG. 3;

FIGS. 5A, 5B, 5C and 5D are schematic diagrams of a balanced driver modification to the transceiver depicted in FIGS. 1 and 3;

FIG. 6 is a block diagram for use in illustrating the operation of the transceiver depicted in FIG. 1;

FIGS. 7A, 7B and 7C are waveform diagrams for use in explaining the operation of the elements depicted in FIG. 6; and FIGS. 8A, 8B, 8C, and 8D are waveform diagrams for use in explaining the operation of the transceiver depicted in FIG. 1.

DETAILED DESCRIPTION OF CERTAIN PREFERRED EMBODIMENTS OF THE INVENTION

Referring now more particularly to FIGS. 6 and 7A through 7C, inclusive, if a short time constant differentiation circuit 2 is supplied with the signal at point A and the differentiated output from the circuit 2 is supplied at point B to the input of a Schmitt trigger, an output C will result. If the input at A is the waveform 6 shown in FIG. 7A the output at B will be a series of positive and negative going spikes having a waveform 8 as shown in FIG. 7B. If the threshold levels of the Schmitt trigger circuit 4 are denoted by lines 7 and 9 in FIG. 7B the output of the Schmitt trigger at C will be the waveform 10 as shown in FIG. 7C. It can thus be seen that the output of the Schmitt trigger at C is a squarewave which is representative of the transitions in the waveform 6. This allows the pulse to be reconstructed from the leading and trailing edges of the pulse.

By a short time constant differentiator is meant that the time constant of the differentiation is short compared to the minimum pulse period. For example if the transceiver is operating at a ten megabit rate then the minimum bit time would be 100 nanoseconds. The time constant of the differentiator circuit of the present invention would be 15% of this time period, typically. The use of the short time constant differentiator 2 allows the Schmitt trigger to be AC coupled to the source of the incoming signal. Without such a differentiation circuit the Schmitt trigger would have to be direct coupled in order to be triggered.

Referring now more particularly to FIG. 1 a computer, controller, or other circuit 10 which is to have access to the communicating medium transmits control signals in the form of data pulses through a driver circuit 12 and a transmission line 14 to the input 18 of the transceiver 16. Incoming data pulses are transformed by a short time constant differentiator 20 to a series of positive and negative going spikes, of the type depicted in the waveform diagram shown in FIG. 7B. This waveform is supplied to the input of a Schmitt trigger 22. The squarewave output from the Schmitt trigger 22 is supplied by a second driver 24 through a primary winding of a bifilar transformer 26 to the center conductor 30 of a coaxial cable 28. The cable 28, it is to be understood, extends for quite some distance and other transceivers 16 (not shown) are to be understood as also being attached to the coaxial cable in a similar manner. The coaxial cable is terminated in characteristic impedances 34 which match the cable impedance.

The side of the primary of the transformer 26 which is not attached to the center conductor 30 is also connected to the input of a buffer amplifier 42. This amplifier 42 typically would have unity gain and it would present high input impedance to the coaxial cable. The output of the amplifier 42 is supplied to a second short time constant differentiator 44 and to an enable circuit 46 for controlling a Schmitt trigger 48. The output of the short time constant differentiator 44 is also supplied to the input of the Schmitt trigger 48. The squarewave output from the Schmitt trigger 48 is supplied through a driver 50 to the output terminal 52 of the transceiver 16.

It should be noted at this point that the transceiver 16 has a floating ground 40 as well as a circuit ground or earth ground 38. A bypass capacitor 36 is connected between the shield 32 of the coaxial cable 28 and to the circuit ground 38. The secondary winding of the transformer 26 is connected between the shield 32 and the floating ground 40. The purpose of this arrangement is to suppress electromagnetic interference which is sometimes caused, as mentioned above, by the connection of the transceiver to the cable 28. The bypass capacitor 36 helps reduce this electromagnetic interference that causes a spike to be produced in the incoming signal line. The direction of the windings of the transformer 26 are such that the voltage produced in the secondary winding of the transformer 26 tends to oppose the spike produced by the capacitor 36 and thus to cancel it. The transformer can consist, for example, of two turns of wire, bifilar wound, on a Ferroxcube type #213CT1050-3B7 ferrite core made by the Ferroxcube Division of Emperex Electronic Corporation, 5083 Kings Highway, Saugerties, N.Y. 12477, a North American Phillips Corporation, Company.

A transmission line 54 is connected between the output terminal 52 and still another short time constant differentiator 56 whose output feeds a Schmitt trigger 58 connected to the circuit 10. Again the purpose of the differentiating circuit 56 and the Schmitt trigger 58 is to allow AC coupling to the transmission line 54 and still preserve the long period information from the received signal.

Referring now more particularly to FIGS. 8A through 8D a series of waveforms are shown taken along the coaxial cable 28 at various distances from the source of transmission. The waveform of the source is shown in FIG. 8A. It can be seen that the signal waveform degrades as the distance from the source increases. These waveform changes are somewhat dependent on frequency and the waveforms shown are for a typical frequency such as several megahertz. The dotted line waveform shown in FIG. 8B shows that for longer distances the waveform tends to increase in direct current amplitude with the duration of the signal. This is because the coaxial cable tends to act in a capacitive manner to average the direct current voltages produced by the pulses. As shown in FIG. 8D at a large enough distance from the source the waveform will have barely perceptible rise times at an almost constant direct current voltage level.

By detecting this direct current voltage level, unwanted noise can be barred from the transceiver. This is the purpose of the enable circuit 46. It has a threshold level which is set higher than the threshold levels of the Schmitt trigger. Noise and residual transmissions typically have maximum amplitudes which are less than the threshold level of the enable circuit 46. When the DC level of a standard transmission is detected by the enable circuit 46 it allows the Schmitt trigger to detect lower voltages which are produced by the actual rise times of the flattened data pulses. It should be understood that the transceiver of the present invention is intended to operate only with unipolar transmissions. Bipolar transmissions will not produce the DC level with distance which has just been discussed and also noise cannot be effectively eliminated by the circuit described above.

Referring now more particularly to FIG. 2 the same components discussed in FIG. 1 have been given the same reference numerals. The transmission line 14 is shown as terminating in two input terminals 18a and 18b of the transceiver 16. A termination resistor 60 is connected between the terminals 18a and 18b. This termination resistor is the characteristic impedance of the transmission line 14.

The differentiation circuit 20 is comprised of a capacitor 62 connected to the input terminal 18a and through a resistor 66 and a capacitor 64 to the input terminal 18b. The junction of the resistor 66 and the capacitor 64 is connected to the floating ground 40. The capacitance of the capacitor 64 is roughly 10 times that of the capacitor 62. Thus if the capacitor 62 is 27 pf the capacitance of the capacitor 64 would be 270 pf. As mentioned above the RC time constant of the differentiation circuit 20 is selected to be very short compared to the minimum pulse width. The connection point of the capacitor 62 and the resistor 66 is connected to the inverting input of a differential amplifier 22 connected in a positive feedback circuit to operate as a Schmitt trigger. The output of the Schmitt trigger 22 is connected through the driver 24 to the anode of a diode 68. The cathode of the diode 68 is connected through the primary winding of the transformer 26 to the center conductor 30.

The cathode of the diode 68 is also connected to the non-inverting input of a differential amplifier 42 whose output is connected to the inverting input of the amplifier to provide unity gain. The output of the amplifier 42 is also supplied to the anode of a diode 70 and to a capacitor 72 whose other lead is connected to the non-inverting input of a differential amplifier connected to have positive feedback and thereby form the Schmitt trigger 48.

The cathod of the diode 70 is connected through a resistor 74 to the cathode of a diode 76. The cathode is connected through a resistor 78 to a negative bias V2. The anode of the diode 76 is connected to the input of the Schmitt trigger 48 and through a resistor 80 to the floating ground 40.

The output of the Schmitt trigger 48, as mentioned above is supplied through the driver 50 to an output terminal 52a. Another output terminal 52b is connected to the circuit ground. The transmission line is connected to these output terminals 52a and 52b. The other end of the transmission line 54 terminates in a termination resistor 82 whose impedance matches the characteristic impedance of the transmission line 54.

The differentiator circuit 56 is comprised of a capacitor 84, connected between the transmission line 54 and the input to the Schmitt trigger 58, a capacitor 86, connected between the other half of the transmission line 54 and the circuit ground, and a resistor 88 which is connected between the circuit ground and the input to the Schmitt trigger 58.

The capacitors 64 and 86 are roughly 10 times the capacitance of the capacitors 62 and 84, respectively. Again, the RC time constants of the differentiation circuits 44 and 56 are selected to be small compared to the minimum pulse period of the signals to be received. By small is meant on the order of 15% of the pulse period time.

The enable circuit 46 operates as follows. When signal is received, unless it has the proper voltage level, the diode 76 will be forward biased and its anode will be at a potential which is below the threshold level of the Schmitt trigger 48. This is due to the connection through the resistor 78 to the minus voltage source V2. If a signal with the proper voltage level and polarity is received, it will produce a voltage drop across the resistor 78 which reverse biases the diode 76, thereby allowing the differentiation circuit comprised of the capacitor 72 and the resistor 80 to differentiate the incoming signal and produce output pulses whose amplitudes exceed the threshold voltage levels of the Schmitt trigger 48, thereby causing it to produce a corresponding squarewave output. Thus the enabling circuit 46 responds to a voltage level which is above the threshold level of the Schmitt trigger 48 so that noise and residual transmission signals are not passed on to the driver 50.

Referring now more particularly to FIG. 3 an additional short time constant differentiator 90 and Schmitt trigger 92 have been added between the input terminal 18 and the short time constant differentiator 20'. Also a short time constant differentiator 94 and a Schmitt trigger 96 have been added between the Schmitt trigger 48 and the driver 50. The purpose of these added stages is to allow the transceiver ground to be tied to the computer ground. In all other respects the circuit operates substantially identically to those shown in FIG. 2. The short time constant differentiators 20' and 94 instead of being resistance-capacitance circuits are constituted by transformers having primary and secondary windings. Since the circuits shown in FIGS. 3 and 4 operate substantially identically to those shown in FIGS. 1 and 2, respectively, the common components have been given identical reference numbers.

Referring now more particularly to FIG. 5, off the shelve type RS422 drivers usually exibit too much skew, i.e. in the order of 2–6 ns. A way to achieve driver capability with almost RS422 standards and almost no or a negligible amount of skew is to use two exclusive OR gates. Thus as shown in FIG. 5A an exclusive OR 98 and an exclusive OR gate 100 have their outputs 102 and 104 connected to drive a balanced line pair 106 which terminate in a characteristic impedance 108. A short time constant differentiation circuit (STD) 110 is connected in parallel with the impedance 108 and the output of the STD 110 is supplied to a Schmitt trigger 112. The STD 110 and the Schmitt trigger 112 can be of the type described in reference to FIGS. 2 and 4.

One input 114 of of the exclusive OR gate 98 is connected to a positive voltage source V+. The other input 116 of the exclusive OR gate 98 is connected to an input 118 of the exclusive OR gate 100. The other input 120 of the exclusive OR gate 100 is connected to the circuit ground. The correspondence of the inputs is that 114 corresponds to 118 and 116 corresponds to 120. Single ended data is supplied to the inputs 116 and 118. This combination of OR gates can be reduplicated by paralleling other exclusive OR gates as will be apparent to those skilled in the art.

In FIGS. 5B, 5C and 5D various types of short time constant differentiation circuits 110', 110'', and 110''' have been illustrated. In FIG. 5B a bifilar transformer 122 constitutes the short term differentiation means. In FIG. 5C the capacitors 124 and 126 together with the resistor 130 constitute the short term differentiation means. These capacitors are roughly equal in their capacitance however they are one tenth of the capacitance of the capacitor 128 connected in the shield ground lead. In FIG. 5D the capacitance 132 and the characteristic impedance 108''' constitute the differentiation means. The advantage of the circuit shown in FIG. 5C is that it allows a full floating ground whereas the circuit in FIG. 5D does not have a floating ground.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A data communication transceiver for transmitting signals to a communicating medium and receiving signals therefrom which are generated by another transceiver, the transceiver comprising
   an input terminal,
   first short time constant differentiation means connected to the input terminal to differentiate signals applied thereto and produce a first differentiated output signal,
   Schmitt trigger means supplied with the differentiated output signal for producing a corresponding first square wave output signal,
   first driver means supplied with the square wave output for supplying it to the communicating medium,
   amplifying means for receiving signals from the communicating medium and for producing an amplified output therefrom,
   second short time constant differentiation means supplied with the amplified output signal for differentiating it and for producing a second differentiated signal,
   second Schmitt trigger means supplied with the second differentiated signal for producing a corresponding second squarewave signal,
   an output terminal, and
   second driver means supplied with the second squarewave signal for supplying it to the output terminal.

2. A data communications transceiver as recited in claim 1 further comprising enabling means supplied with the amplified output signal for controlling the second Schmitt trigger means to produce the second squarewave signal only when the amplitude of the amplified output signal exceeds a predetermined value.

3. A data communications transceiver as recited in claim 1 or 2 further comprising a transformer having primary and secondary windings for interconnecting the first driver and the amplifying means to the communicating medium.

4. A data communications transceiver as recited in claim 3 wherein
   the transceiver has a floating ground and a circuit ground,
   the communicating medium is a coaxial cable having an inner conductor and a shield,
   the primary winding is connected in series between the inner conductor of the communicating medium and the first driver and the amplifying means,
   the secondary winding is connected in series between the shield and the floating ground, and further comprising
   a capacitor connected between the shield and the circuit ground.

5. A data communications transceiver as recited in claim 4 wherein the transformer is of the bifilar type.

6. A data communications transceiver as recited in claim 1 further comprising third driver means, an input transmission line interconnecting the third driver means and the input terminal, third Schmitt trigger means, third short time constant differentiator means connected to supply the third Schmitt trigger means, and an output transmission line interconnecting the second driver means and the third Schmitt trigger means.

7. A data communications transceiver as recited in claim 1 or 6 further comprising a circuit ground, a separate input and output balanced pair transmission lines, and wherein at least one of said driver means comprise a first pair of exclusive OR gates, each gate having an output connected to a separate one of the transmission lines of one of the pairs and each gate having corresponding pairs of inputs, one of the inputs of one of the gates being connected to the circuit ground, the other input of the one gate being connected to the non-corresponding input of the other gate and to the output of the second Schmitt trigger means, and means for supplying a bias voltage to the remaining input of the other gate.

* * * * *